(12) United States Patent
Anand

(10) Patent No.: US 7,280,657 B2
(45) Date of Patent: Oct. 9, 2007

(54) DATA ENCRYPTION AND DECRYPTION SYSTEM AND METHOD USING MERGED CIPHERS

(75) Inventor: Satish N. Anand, Chandler, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 827 days.

(21) Appl. No.: 10/161,070

(22) Filed: May 31, 2002

(65) Prior Publication Data

US 2003/0002664 A1 Jan. 2, 2003

Related U.S. Application Data

(60) Provisional application No. 60/298,027, filed on Jun. 13, 2001.

(51) Int. Cl.
H04K 1/00 (2006.01)
H04L 9/28 (2006.01)
H04L 9/00 (2006.01)

(52) U.S. Cl. .......................................... 380/37; 380/28
(58) Field of Classification Search .................. 380/37, 380/28
See application file for complete search history.

(56) References Cited

U.S. PATENT DOCUMENTS 5,003,597 A * 3/1991 Merkle .......................... 380/37
5,317,638 A 5/1994 Kao et al. ...................... 380/29
5,432,848 A 7/1995 Butter et al. .................... 380/2

OTHER PUBLICATIONS

Bruce Schneier, and John Kelsey, "Unbalanced Feistel Networks and Block-Ciper Design", Counterpane Systems.*
Wikipedia, "Feistel cipher", www.wikipedia.com, viewed Jan. 18, 2006.*
Alfred L. Menezes, Paul C. van Oorschot, Scott A. Vanstone, "Chapter 7: Section 4", Handbook of Applied Cryptography, Revised Edition, 1997, p. 250-259.*
Broscius A G et al: "Exploiting Parallelism in Hardware Implementation of the Des" Advances in Cryptology. Santa Barbara, Aug. 11-15, 1991, Proceedings of the Conference on Theory and Applications of Cryptographic Techniques (Crypto), Berlin, Springer, DE, 1991, pp. 367-376, XP000269040.
International Search Report mailed Nov. 29, 2002 from European Patent Office for counterpart PCT application No. PCT/US02/19083.

* cited by examiner

*Primary Examiner*—Nasser Moazzami
*Assistant Examiner*—Eleni A Shiferaw
(74) *Attorney, Agent, or Firm*—RatnerPrestia

(57) ABSTRACT

A system and method for implementing the Triple Data Encryption Algorithm (TDEA) for the Data Encryption Standard (DES) using merger ciphers is provided which may be configured to operate in the chain block cipher (CBC) mode. Data blocks are enciphered using less computations in the critical timing path significantly reducing the time required for each round of ciphering. Two permutation function (Ef) elements (218, 220) operate separately during each ciphering round eliminating an XOR operation from the critical path.

26 Claims, 3 Drawing Sheets

DATA ENCRYPTION AND DECRYPTION SYSTEM AND METHOD USING MERGED CIPHERS

CROSS-REFERENCE TO RELATED APPLICATIONS

This application claims the benefit of the filing date of U.S. application Ser. No. 60/298,027 filed Jun. 13, 2001 filed under 35 U.S.C. § 119(e).

FIELD OF THE INVENTION

This invention relates in general to the field of cryptography, in particular to block ciphering and more particularly to implementations of the Triple Data Encryption Algorithm (TDEA) for the Data Encryption Standard (DES) using merged ciphers.

BACKGROUND OF THE INVENTION

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Mathematical algorithms are used to describe the functioning of ciphers. The goal of a cipher is to be computationally infeasible to "break"-that is, it must be nearly impossible to "guess" or derive the original data content from any series of computations that can be performed on the transformed data, absent knowledge of how the encryption was accomplished. Use of a "key" during the encryption and decryption processes helps make the cipher more difficult to break. A key is a randomly-generated number factored into operation of the encryption to make the result dependent on the key. The value used for the key in effect "personalizes" the algorithm, so that the same algorithm used on the same input data produces a different output for each different key value. When the value of this key is unknown to the unauthorized persons, they will not be able to duplicate or to reverse the encryption. Provided that the key is kept secret, the algorithm that performs the ciphering can be made public. The key will be known to the parties intended to encrypt and decrypt the data: they can use the key to "lock" and "unlock" the data contents, whereas unauthorized persons cannot. When the same key is used for encrypting and for decrypting, the key is referred to as being "symmetric".

A cipher to be used in a computer system can be implemented in hardware, in software, or in a combination of hardware and software. A commonly used cipher is known as the Data Encryption Algorithm ("DEA"). A variant of the DES algorithm, known as "Triple DES", was developed to increase the strength of the result over that available with DES. Triple DES uses several rounds of ciphering, with different keys for each of the rounds.

One way to make a cipher stronger is to increase the number of rounds of ciphering performed because with each successive transformation, the resulting encryption becomes more difficult to break. It will be appreciated that the computations involved to cipher data are quite complex, and that while performing more rounds of ciphering increases the strength of the result, it also causes computation time to increase.

Because hardware-based encryption systems are typically much faster than software based encryption systems, hardware based systems are preferable, especially for dedicated ciphering operations. A hardware implementation may be a semiconductor chip, such as a DES chip implementing a complete DEA function, or in firmware in a dedicated processor. Hardware implementations usually require specialized off-the-shelf chips or custom ASICs (Application Specific Integrated Circuits) which implement the complete data encryption process. The processor in which the ASIC device is used loads in a key, sets the mode of operation, and passes the data through the encryption system.

In typical DES implementations, in each round of ciphering, a permuting function (Pf) output is XOR'ed with the left input to generate the output of the cipher round. This is provided to a permuting function element (Ef) in the next round of ciphering. The output of the permuting function (Ef) is XOR'ed with a key output for that round to generate the selection function (S-box) input. As those of skill in the art will appreciate, there are normally two XOR functions (gates) in the critical timing path. To improve ciphering speed, it is therefore highly desirable to reduce the time required for critical path operations, especially when many rounds of ciphering are desired for improved security.

Accordingly, what is needed is an improved method and system for ciphering. What is also needed is a method and system for encrypting and decrypting data blocks in less time that prior methods and systems. What is also needed is method and system for encrypting and decrypting data blocks utilizing less gates in the critical timing path to provide improved ciphering speed.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things a system and method for performing enciphering and deciphering of data blocks. In accordance with the preferred embodiment, the system and method of the present invention performs the Data Encryption Algorithm (DEA) and the Triple Data Encryption Algorithm (TDEA) for the Data Encryption Standard (DES) using merger ciphers, which is described in Federal Information Processing Standard (FIPS) publication 46-3 dated Oct. 25, 1999 describes the specifications for the Data Encryption Standard (DES). In the preferred embodiment, the cipher block chaining (CBC) mode is implemented.

In accordance with the preferred embodiment of the present invention, significant processing performance is achieved through the reduction of steps required in the critical timing path. For example, while typical DES implementations require two XOR computations in the critical path, the system and method of the present invention implement only one XOR computation in the critical timing path. Because DES requires many rounds of ciphering for each data block to be enciphered, significant performance improvement is achieved.

Figure 1:
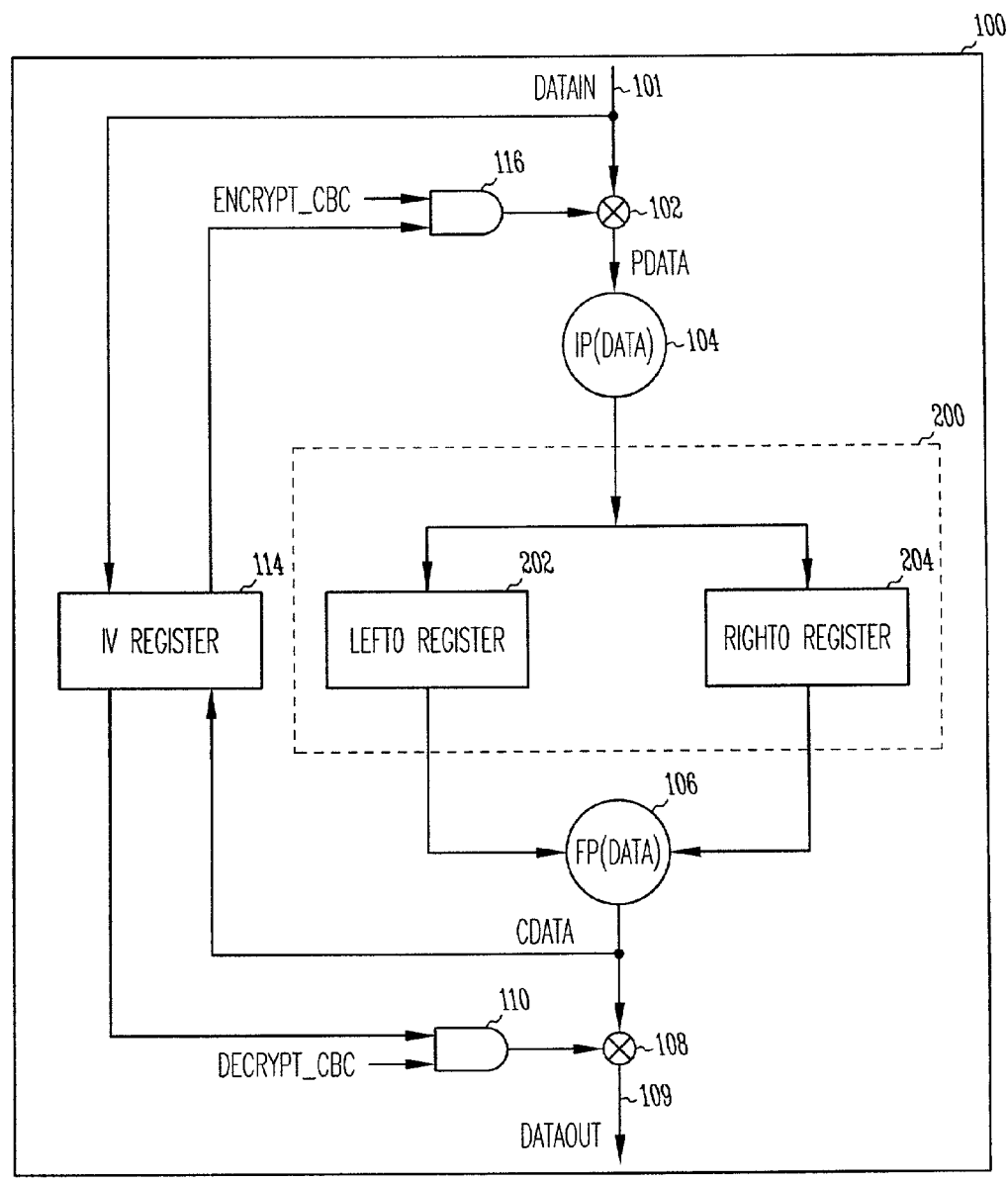
FIG. 1 illustrates a simplified functional block diagram of a system for enciphering data blocks in accordance with a preferred embodiment of the present invention.

FIG. 1 illustrates a simplified functional block diagram of a system for enciphering data blocks in accordance with a preferred embodiment of the present invention. System 100 is suitable for block encrypting and block decrypting data blocks. Although the present invention is suitable for other types of ciphering, in accordance with the preferred embodiment, system 100 is described herein in terms of implementing the DEA and the Triple DEA for the DES using merger ciphers which operates on 64-bit blocks of data in the cipher block chaining (CBC) mode. In general, system 100 operates similarly to either encrypt or decrypt data blocks.

At node 101, an input data block of 64-bits (identified as 'datain') is received for either enciphering or deciphering. Element 102 performs an exclusive "OR" (XOR) operation (i.e., a bit-by-bit addition modulo "2") on the input data block and an output of element 116. In element 104, an initial permutation (IP) is performed on the 64-bit block of data to be enciphered (or deciphered as the case may be) producing initial right and initial left data blocks ($R_0$, $L_0$) each having 32-bits. The initial right and initial left data blocks ($R_0$, $L_0$) are loaded into corresponding registers (202, 204). Cipher block portion 200 performs an iterative ciphering operation on the register values. The final right and left data blocks ($R_n$, $L_n$) each having, for example, 32-bits are provided in corresponding registers (202, 204) and together comprise a final output data block of preferably 64-bits. In element 106, a final permutation is performed providing the output data block (shown as cdata). The final permutation is preferably an inverse of the initial permutation performed by element 104. The output data block is XOR'ed in element 108 with the output from element 110 to produce the final output data block of system 100 at node 109.

When system 100 operates in the CBC mode for encryption, an initial value (IV) is used to modify the input data. The IV from IV register 114 is XOR'ed with the input data in element 102 to generate the input data block (illustrated as 'pdata') for element 104. During the CBC encryption mode, the output from element 106 (illustrated as 'cdata') is loaded into IV register 114 and is used as the initial value for the next block of data to be encrypted. Element 116 provides for the selection the encrypt CBC mode based on the selection signal illustrated as 'Encrypt_CBC'. For other than CBC mode, the IV is comprised of zeroes.

When system 100 operates in the CBC mode for decryption, the IV register stores the previous input data block (illustrated as 'datain') and element 108 XOR'es the previous input data block with the output block. Element 110 provides for the selection the decrypt CBC mode based on the selection signal illustrated as 'Decrypt_CBC'.

Figure 2A:
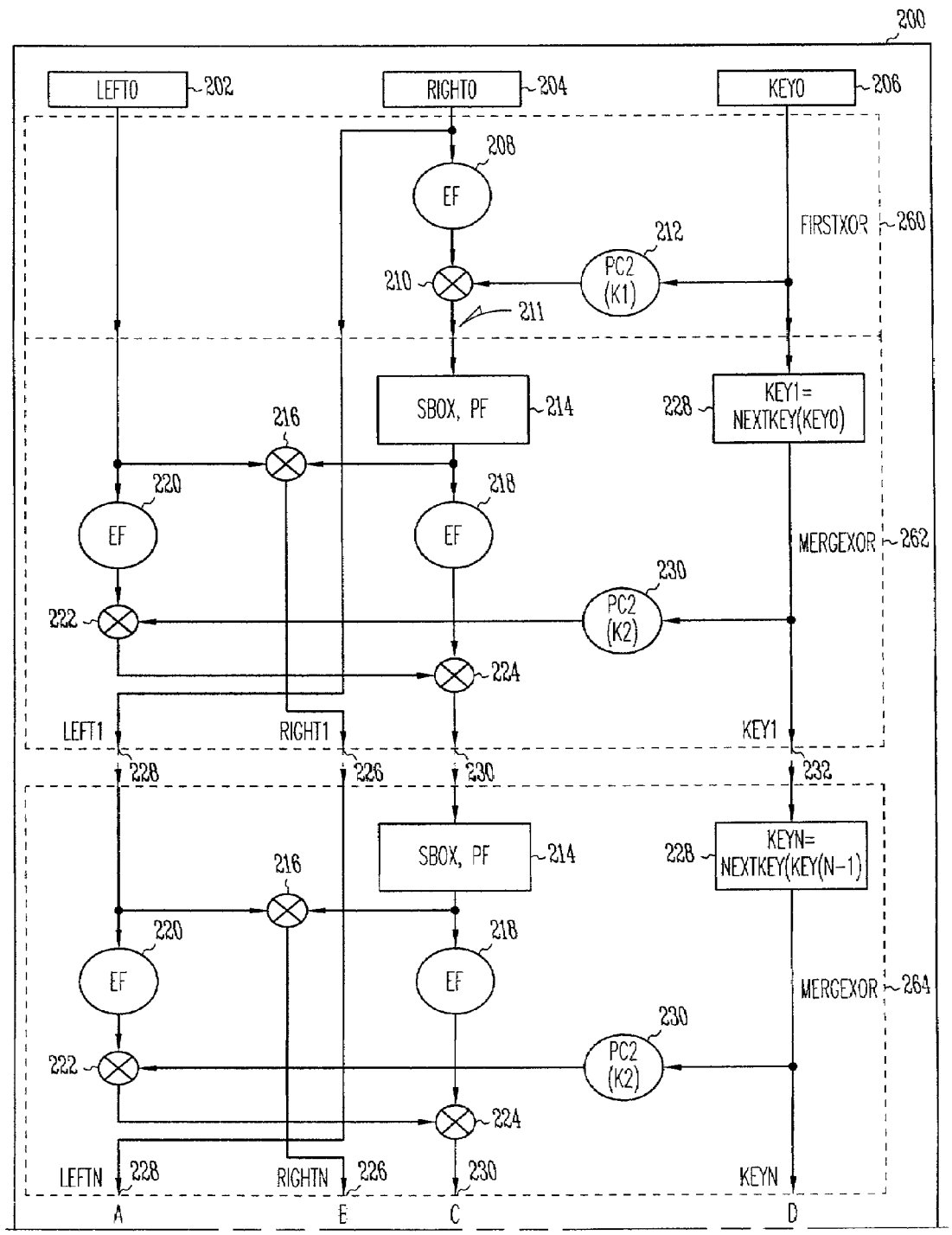
FIG. 2 illustrates a simplified functional block diagram of a cipher block portion of a system for enciphering data blocks in accordance with a preferred embodiment of the present invention.
Figure 2B:
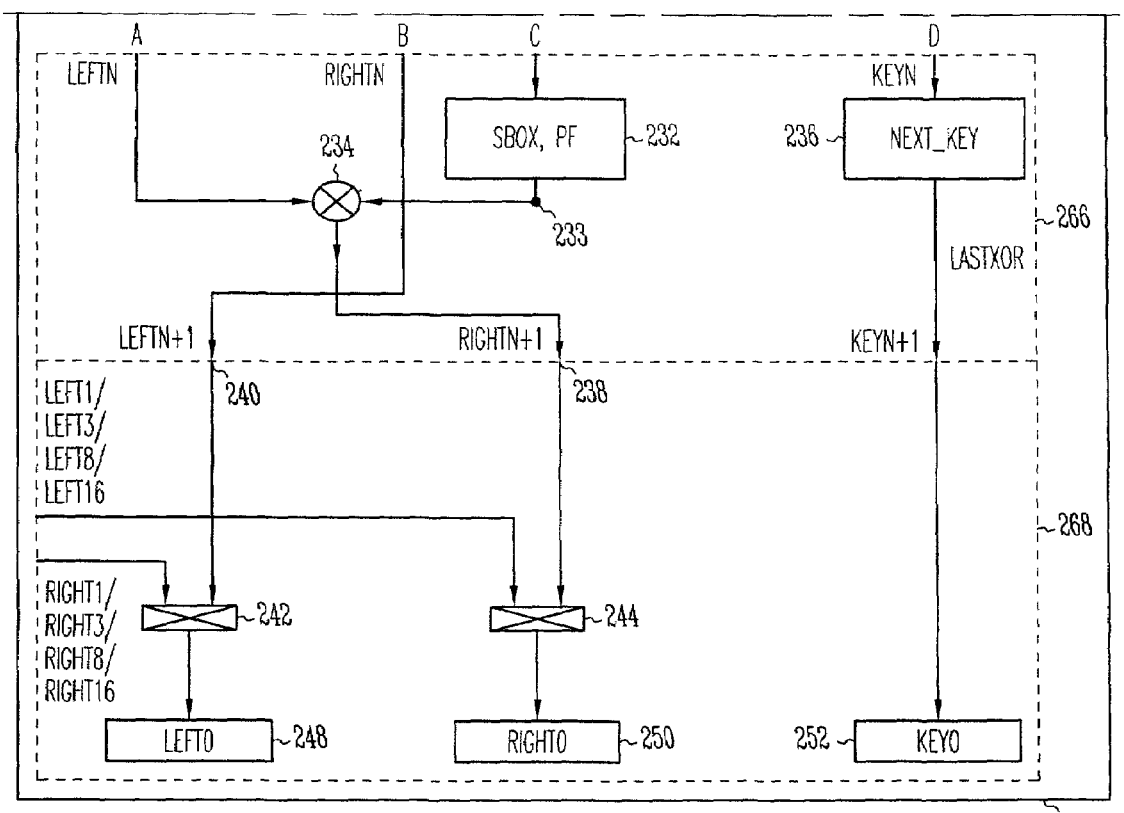

FIG. 2 illustrates a simplified functional block diagram of a cipher block portion of a system for enciphering data blocks in accordance with a preferred embodiment of the present invention. Cipher block portion 200 of system 100 comprises initial cipher round block 260, a plurality of cipher round blocks 262, a final cipher block 266 and cipher output swapping block 268. FIG. 2 illustrates two cipher round blocks, one shown as cipher round block 262 and the other shown as cipher round block 264. In accordance with the preferred embodiment, portion 200 is preferably implemented with either one, three, four, eight or sixteen cipher round blocks, each performing their cipher round operations preferably during one clock cycle. Since DES ciphering requires sixteen rounds of ciphering, one clock cycle is needed if sixteen cipher round blocks are implemented, two clock cycles are needed when eight cipher round blocks are implemented, four clock cycles are needed when four cipher round blocks are implemented, and six clock cycles are needed when three cipher round blocks are used. Cipher block portion 200 is fabricated with a predetermined number of cipher round blocks which remain fixed in hardware. As it can be seen, system ciphering performance is greatly enhanced with an increased number of cipher blocks at the expense of added hardware. Cipher rounds as used herein refers to the number of times the s-box (selection) function operates on the data.

Registers 202 and 204 store respectively initial right and initial left data blocks ($R_0$, $L_0$) each having 32-bits. Register 206 holds an initial key (KO) which is updated in accordance with key schedule calculations. The initial right and initial left data blocks are provided by the initial permutation function 104 (FIG. 1). Registers 202 and 204 are updated throughout the ciphering process and upon completion, store the enciphered right and left data blocks.

In element 208, a permutation function (Ef) is performed on the right initial data block (R0) to generate a first interim data block having 48-bits. In element 210, the first interim data block is XOR'ed with a first key (K1)(212) of a key schedule to generate a second interim data block having 48-bits. The key schedule calculation is preferably implemented by element 228 in accordance with the DES standard, and is preferably done externally to cipher block portion 200.

In element 214, a selection function is implemented on each 6-bit block of the second interim data block producing a 4-bit data block for each of the 6-bit blocks and resulting in a third interim data block having 32-bits. In element 214, a permutation function (Pf) is performed on the third interim data block to produce a fourth interim data block having 32-bits. In element 216, the fourth interim data block is XOR'ed with the initial left data block (L0) to produce a first right data block (R1) (230) having 32-bits.

In element 220, the permutation function (Ef) is performed on the initial left data block to produce a fifth interim data block having 48-bits. In element 222, the fifth interim data block is XOR'ed with a second key (K2) of the key schedule to generate a sixth interim data block having 48-bits.

In element 218, the permutation function (Ef) is performed on the fourth interim data block to generate a seventh interim data block. In element 224, the sixth interim data block and the seventh interim data block are XOR'ed to produce an eighth interim data block having 48-bits.

It should be noted that at this point, element 216 produced the first right data block (R1) which is stored in right register 204 and is used as right input (226) for the next round of ciphering, which may be performed by the next cipher block 264. It also should be noted that at this point, the initial right data block (R0) becomes the first left data block (L1) which is stored in left register 202, and is used as the left input (226) for the next round of ciphering. It also should be noted that the cipher round output (230) of element 224 (identified as the eighth interim data block) serves as a cipher round input for the selection function (214) of the next round of ciphering to be performed by the next cipher block 264. In the case where cipher block portion 200 includes only one cipher block 262, outputs 226, 228 and 230 serve as inputs to final cipher block 266.

The elements illustrated in each subsequent cipher block 264 perform the functions described above with the input from the previous cipher block. It should be noted that each cipher block (262 or 264) performs a round of ciphering. For each round of ciphering, a next key (Kn) from the key schedule is used (230) where "n" corresponds with the cipher round. Each round of ciphering produces a left data block (Ln) and a right data block (Rn) at outputs 228 and 226 respectively.

Upon completion of performance of a number of rounds of ciphering as determined by the number of cipher blocks 262 and 264, final cipher block 266 operates on the outputs of cipher block 264.

Element 232 performs the selection function on the cipher block output of element of 224 (of cipher block 264) referred to above as the eighth interim data block to produce a data block having 48-bits. Element 232 also performs the permutation function (Pf) to produce a tenth interim data block having 48-bits. Element 234 XOR'es the tenth interim data block with the left data block (Ln) from output 228 to produce the next right output data block (Rn+1) at output 238. The prior right data block (Rn) becomes the next left output data block (Ln+1) at output 240. A next key (Kn+1) (236) from the key schedule is stored in key register 206.

The next right output data block (Rn+1) and the next left output data block (Ln+1) are stored in registers 204 and 202 respectively and are operated on by cipher output swapping block 268. In cipher output swapping block 268, the left and right outputs are swapped depending on the number of cipher rounds performed. In the preferred embodiment of the present invention that implements DES, when "n" is 1, 3, 8 or 16, the next right output data block (Rn+1) and the next left output data block (Ln+1) are swapped and stored in registers 202 and 204.

In the DES embodiment, sixteen cipher rounds are required to be performed. During the next clock cycle cipher block portion 200 repeats the operations described above using the values stored in registers 202, 204 and 206. This process is repeated for a number of cycles until at least sixteen cipher rounds are completed. In a situation where there are three total cipher blocks implemented (e.g., one cipher block 262 and two cipher blocks 264) after the six necessary cycles, final cipher block results in "n" equaling a number greater that 16, such as 18. In this case, the outputs L16 and R16 at the completion of the sixteenth cipher round are stored in registers 202 and 204. A state machine is used to track the number of cipher rounds.

The permutation function (Ef) is preferably in accordance with the DES standard "E" function which takes a block of 32-bits and yields a block of 48-bits as output. The selection (S-box) function is preferably in accordance with the DES standard which yields a four-bit block for each six-bit input block. The permutation function (Pf) is preferably in accordance with the DES standard "P" function which yields a 32-bit output from a 32-bit input. It should be noted that the present invention is equally applicable to other permutation and selection functions operating on and providing different bit amounts.

The key used for each round of ciphering is generated based on a key schedule using the prior value in key register 206, and is preferably performed external to cipher block portion 200. For DES, the key schedule uses a 56-bit key to provides a 48-bit key for each cipher block round. During encryption operations, a left key shift of either one or two bits is performed, while for decryption, a right key shift of either one or two bits is performed for each round of ciphering. The key shift signal is generated by a state machine based on the cipher round count. Key schedule calculations and preferably in accordance with DES resulting in a 48-bit key used for each round of ciphering, although other key lengths are also applicable.

As can be seen, cipher block portion 200 reduces the number of XOR operations in the critical timing path. The permuting function (Ef) operates on both the left input as well as the output from the permuting function (Pf). The output of left permuting function (Ef) (220) is XOR'ed (222) with the key producing an output which is stable in time much earlier than the S-box output. The critical timing path for each round of ciphering thus comprises the path through the S-box, the permuting function (Pf) and XOR gate (224), which is one less XOR gate that standard DES implementations. It should be noted that the permuting functions do not result in any gate delay and comprise only bit permutation and/or duplication.

Thus, a data encryption and decryption system and method have been described providing for significant performance increases over prior art methods and systems. A reduced computation time is achieved through reducing the number of gates in the critical path. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of enciphering left and right input data blocks producing left and right output data blocks comprising:

performing (214) a select function and a permuter function (PF) on a cipher round input data block (211) to produce a first interim data block;

combining (216) the first interim data block with the left input data block to produce the right output data block;

performing (220) a permuter function (Ef) on the left input data block to produce a second interim data block;

combining (222) the second interim data block with a key from a key schedule to produce a third interim data block;

performing (218) the permuter function (Ef) on the first interim data block to produce a fourth interim data block; and combining (224) the fourth interim data block with the third interim data block to produce a cipher round output data block (230), wherein the right input data block is set to be the left output data block, and the left output data block, right output data block and cipher round output data block correspond, respectively, with the left input data block, right input data block and cipher round input data block for use in subsequent rounds of ciphering.

2. The method as claimed in claim 1 wherein prior to a first round of ciphering, the cipher round input data block is generated by performing (208) the permuter function (Ef) on the right input data block and combining (210) a result with one of the keys (212) of the key schedule.

3. The method as claimed in claim 2 wherein upon completion of a predetermined number of rounds of ciphering, the method further comprises:

performing (232) the select function and the permuter function (Pf) of the cipher round output data block to produce a fifth interim data block (233); and combining (234) the fifth interim data block with the left output data block to produce a final right data block (238), wherein the right output data block is set to be a final left data block (240).

4. The method as claimed in claim 3 further comprising, when the number of cipher rounds performed is a predetermined number, swapping (242, 244) the final left data block and the final right data block.

5. The method as claimed in claim 4 wherein the swapping is performed when the number of cipher rounds performed is either 1, 3, 8 or 16.

6. The method as claimed in claim 3 comprising:

performing an initial permutation (104) on an input data block to be enciphered to produce a data block consisting of the left and right input data blocks; and performing a final permutation (106) on a data block consisting of the final left and final right output data blocks to produce an enciphered output data block.

7. The method as claimed in claim 3 wherein each of the combining comprises performing a bit-by-bit addition modulo "2".

8. The method as claimed in claim 3 wherein the key schedule provides a 48-bit permuted selection of bits from the key for each round of ciphering.

9. The method as claimed in claim 3 wherein the permuter function (Pf) yields a 32-bit output data block from a 32-bit input data block by permuting the bits of the 32-bit input data block, each bit of the 32-bit input data block being permuted to one position of the 32-bit output data block.

10. The method as claimed in claim 3 wherein the permuter function (Ef) yields a 48-bit output data block from a 32-bit input data block wherein some bits of the 32-bit input data block are permuted to more than one position of the 48-bit output data block.

11. The method as claimed in claim 1 wherein for each subsequent round of ciphering performed, a next key (230) from the key schedule is used in combining (222) the second interim data block to produce the third interim data block.

12. A system that enciphers left and right input data block producing left and right output data blocks comprising:

a select function element (214) implementing a selection function on a cipher round input data block to produce a select function output;

a first permuter function element (211) performing a permutation function (Pf) on the select function output to produce a first interim data block;

a first logic element (216) for combining the first interim data block with the left input data block to produce the right output data block;

a second permuter function element (220) performing a permutation function (Ef) on the left input data block to produce a second interim data block;

a second logic element (222) combining the second interim data block with a key from a key schedule to produce a third interim data block;

a third permuter function element (218) performing the permutation function (EQ on the first interim data block to produce a fourth interim data block; and a third logic element (224) combining the fourth interim data block with the third interim data block to produce a cipher round output data block (230), wherein the right input data block is set to be the left output data block, and the left outout data block, right outout data block and cipher round output data block correspond, respectively, with the left input data block, right input data block and cipher round input data block used for subsequent rounds of ciphering.

13. The system as claimed in claim 12 further comprising an initial cipher round block (260) that operates prior to first rounds of ciphering, the initial cipher round block comprising:

a fourth permuter function element (208) performing the permutation function (Ef) on the right input data block to produce a fourth permuted output; and a fourth logic element (210) combining the fourth permuted output with one of the keys (212) of the key schedule to generate the cipher round input data block.

14. The system as claimed in claim 12 further comprising a final cipher round block (266) that operates upon completion of a predetermined number of rounds of ciphering, the final cipher round block comprising:

a second select function element (232) performing the select function on the cipher round output data block;

a fifth permuter function element (232) performing a permutation function (Pf) on an output of the second select function element to produce a fifth interim data block (233); and a fifth logic element (234) combining the fifth interim data block with the left output data block to produce a final right data block (238), wherein in the final cipher round block (266) the right output data block is set to be a final left data block (240).

15. The system as claimed in claim 14 further comprising an output swapping block for swapping the final left and right data blocks when the number of cipher rounds performed is a predetermined number.

16. The system as claimed in claim 15 wherein the system is fabricated as part of an integrated circuit.

17. The system as claimed in claim 14 wherein the first, second, third, fourth and fifth logic elements perform a bit-by-bit addition modulo "2".

18. The method as claimed in claim 12 wherein the permuter function (Pf) yields a 32-bit output data block from a 32-bit input data block by permuting the bits of the 32-bit input data block, each bit of the 32-bit input data block being permuted to one position of the 32-bit output data block.

19. The method as claimed in claim 12 wherein the permuter function (Ef) yields a 48-bit output data block from a 32-bit input data block wherein some bits of the 32-bit input data block are permuted to more than one position of the 48-bit output data block.

20. A method of enciphering blocks of data wherein an initial permutation (IP) is performed on a 64-bit block of data to be enciphered producing initial right and initial left data blocks ($R_0$, $L_0$), the method comprising:
  generating (260) a cipher round input data block (211);
  performing (262, 264) a predetermined number of ciphering rounds using the initial right and initial left data blocks ($R_0$, $L_0$) and the cipher round input data block to generate a right and left output data blocks ($R_n$, $L_n$) and a cipher round output data block; and
  performing (266) a final cipher round using the right and left output data blocks ($R_n$, $L_n$) and the cipher round output data block to generate final right and left output data blocks;
  wherein the generating comprises:
    a) performing (208') a first permutation function (Ef) on the right initial data block (RO) to generate a first interim data block; and
    b) XOR'ing (210) the first interim data block with a first key (K1) of a key schedule to generate a second interim data block;
    wherein the performing (262,264) a predetermined number of ciphering rounds comprises:
    c) implementing a selection function (214) on each 6-bit block of the second interim data block producing a 4-bit data block for each of the 6-bit blocks;
    d) performing (214) a second permutation function (Pf) on the third interim data block to produce a fourth interim data block;
    e) XOR-ing (216) the fourth interim data block with the initial left data block (LO) to produce a first right data block (R1) (230);
    f) performing (220) the first permutation function (Ef) on the initial left data block to produce a fifth interim data block;
    g) XOR'ing (222) the fifth interim data block with a next key of the key schedule to generate a sixth interim data block;
    h) performing (218) the first permutation function (Ef) on the fourth interim data block to generate a seventh interim data block; and
    i) XOR'ing (224) the sixth interim data block and the seventh interim data block to produce an eighth interim data block.

21. The method as claimed in claim 20 wherein the performing (262, 264) a predetermined number of ciphering rounds further comprises: j) repeating elements c) through i) wherein for each repetition:
  element c) uses the eighth interim data block produced by element i) for the second interim data block;
  elements e) and f) use a prior output of element e) as the initial left data block; and element g) uses a next key of the key schedule to produce a right output data block, the right input data block being set as the left input data block.

22. The method as claimed in claim 21 wherein the performing (266) a final cipher round comprises:
  k) performing (232) the selection function on the eighth interim data block to produce a ninth interim data block;
  l) performing (232) the second permutation function (Pf) on the ninth interim data block to produce a tenth interim data block;
  m) XOR'ing (234) the tenth interim data block with the left output data block produced in element e) to produce a final right output data block,
  and wherein the right output data block is set as the left final output data block.

23. A method of enciphering blocks of data in accordance with a data encryption algorithm (DEA) wherein an initial permutation (IP) is performed on a 64-bit block of data to be enciphered producing initial right and initial left data blocks ($R_0$, $L_0$) each having 32-bits, the method comprising:
  a) performing (208) a first permutation function (Ef) on the right initial data block (RO) to generate a first interim data block having 48-bits;
  b) XOR'ing (210) the first interim data block with a first key (Ki) of a key schedule to generate a second interim data block having 48-bits;
  c) implementing a selection function (214) on each 6-bit block of the second interim data block producing a 4-bit data block for each of the 6-bit blocks and resulting in a third interim data block having 32-bits;
  d) performing (214) a second permutation function (Pf) on the third interim data block to produce a fourth interim data block having 32-bits;
  e) XOR'ing (216) the fourth interim data block with the initial left data block (LO) to produce a first right data block (R1) (230) having 32-bits;
  f) performing (220) the first permutation function (Ef) on the initial left data block to produce a fifth interim data block having 48-bits;
  g) XOR'ing (222) the fifth interim data block with a second key (K2) of the key schedule to generate a sixth interim data block having 48-bits;
  h) performing (218) the first permutation function (Ef) on the fourth interim data block to generate a seventh interim data block; and
  i) XOR'ing (224) the sixth interim data block and the seventh interim data block to produce an eighth interim data block having 48-bits,
  j) repeating elements c) through i) for each of a predetermined number of cipher rounds wherein for each repetition:
  element c) uses the eighth interim data block produced by element i) for the second interim data block;
  elements e) and f) use a prior output of element e) as the initial left data block; and
  element g) uses a next key of the key schedule to produce a right output data block, and the right input data block is set as the left output data block,
  k) performing (232) the selection function on the eighth interim data block to produce a ninth interim data block having 32-bits;
  l) performing (232) the second permutation function (Pf) on the ninth interim data block to produce a tenth interim data block having 48-bits;
  m) XOR'ing (234) the tenth interim data block with the left output data block produced in element e) to produce a final right output data block,
  and wherein the right output data block is set as the left final output data block.

24. The method as claimed in claim 23 further comprising n) swapping the left and right output data blocks when the predetermined number of cipher rounds is either 1, 3, 8 or 16.

25. The method as claimed in claim 24 wherein elements a) through n) are repeated until element c) is repeated at least sixteen times.

26. The method as claimed in claim 25 further comprising performing a final permutation function (FP) 106 on the right and left output data blocks to produce an enciphered data block.

* * * * *